Dec. 8, 1936.  E. V. COLLINS  2,063,584
SOIL MOVING MACHINE
Filed Jan. 10, 1935
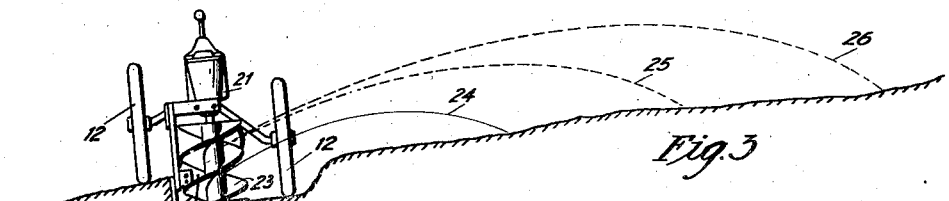
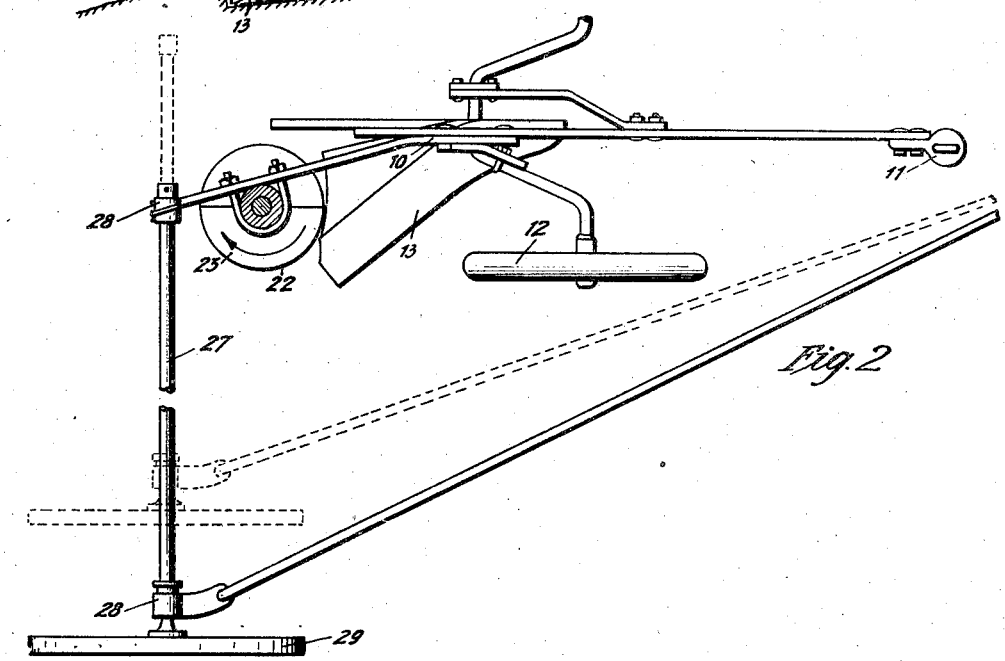
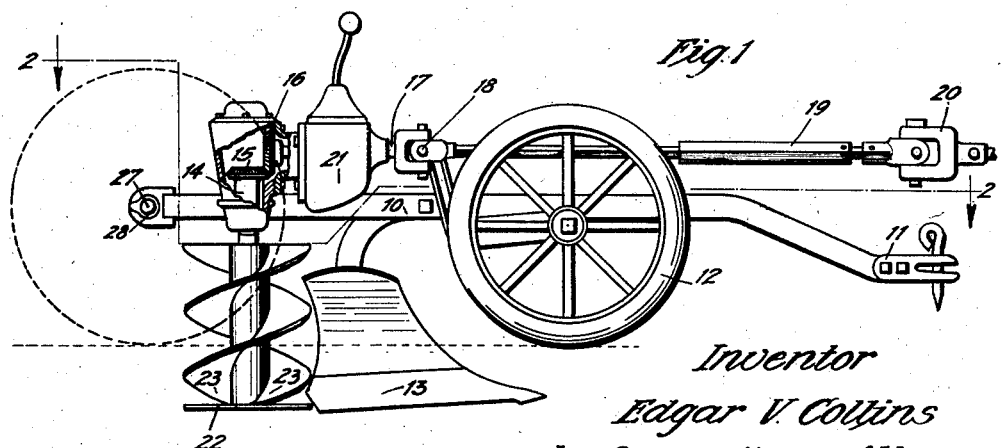
Inventor
Edgar V. Collins
by Orwig & Hague Attys.

Patented Dec. 8, 1936

2,063,584

UNITED STATES PATENT OFFICE 2,063,584

SOIL MOVING MACHINE

Edgar V. Collins, Ames, Iowa, assignor to Iowa State College Alumni Association, Incorporated, Ames, Iowa, a corporation of Iowa Application January 10, 1935, Serial No. 1,139

9 Claims. (Cl. 97—43)

In the art of reclaiming soil for agricultural purposes which has been badly eroded, it is the present practice to provide terraces, and this is done by moving soil into ridges extending transversely across the path of travel of the eroding water flow, and to otherwise smooth and level up the surface of the soil.

Prior to my invention it was the practice to do this terracing by means of implements such as plows, scrapers and grading machines. These method of soil moving have not proven entirely satisfactory due to the fact that they cannot be operated efficiently under adverse soil conditions, such, for instance, as too much or too little moisture, and with the conveyor type of graders the expense of operation is excessive.

The object of my invention is to provide a soil moving machine of simple, durable and inexpensive construction, capable of being operated by a tractor or the like at relatively high speed, and so arranged that when the soil is in any condition where a furrow slice can be turned with a plow, the machine can be easily and conveniently controlled by an operator to throw the entire soil from a furrow slice upwardly and laterally to a comparatively great distance, or any lesser pre-determined distance, so that soil can be taken from any desired location and placed in a desired position for successful terracing work.

A further object is to provide means of simple, durable and inexpensive construction for stopping the soil being thrown from the machine at any desired pre-determined distance from the machine, so that it may all be deposited in a ridge at a selected point.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a side elevation of my improved machine with a portion of the gear case broken away to show the gears. The dotted circular line indicates the position of the soil stopping device relative to the soil throwing member.

Figure 2 shows a horizontal sectional view on the line 2—2 of Figure 1. The dotted lines show the position of the soil stopping device adjusted inwardly toward the soil throwing device.

Figure 3 shows a rear end elevation of my improved machine in position for operation and in a furrow in the soil, the dotted lines showing the different distances to which soil may be thrown laterally and upwardly by my machine.

Referring to the accompanying drawing I have used the reference numeral 10 to indicate generally the machine frame. At its forward end is a coupler 11 by which the machine may be attached to a tractor or the like, and the frame is provided with supporting wheels 12.

Carried by the frame is an earth cutting and lifting member indicated generally by the numeral 13, and is substantially in the form of an ordinary plow and moldboard, the moldboard being of less length from front to rear than is customary in plows. The operation of this earth cutting and elevating mechanism member is substantially that of an ordinary plow except that the furrow slice is not completely turned over, due to the shortness of the moldboard, but is delivered to a point in the rear of the moldboard, with the furrow slice in a substantially upright position.

The earth throwing member comprises an upright shaft 14 mounted in suitable bearings in the usual frame and having a beveled pinion 15 at its upper end in mesh with a beveled pinion 16 on a horizontal shaft 17. This shaft 17 is provided with a joint at 18, of the usual construction, and is also telescopically inserted in the angular sleeve 19, and is connected at its forward end with a power takeoff device 20, such as is usually employed in tractors.

Applied to this shaft 17 is a manually controlled gear shift 21 of the kind now commonly used in automobiles for selectively driving the shaft 14 at different speeds. When the implement is being advanced by a tractor the operator may, by the gear shift device, drive the shaft 14 at several pre-determined selective speeds.

Fixed to the lower end of the shaft 14 is a circular disc 22, and fixed to the body of the shaft 14, above the disc 22, are two oppositely disposed helicoid blades 23 extending from said disc 22 to a point above the position at which the soil cutting and elevating member will deliver soil to the soil throwing member.

The total effective area of the soil throwing member formed by the two blades is such that when the furrow slice is delivered to said blades from the plow, all of the soil thus delivered will be engaged by, and temporarily rest upon, the top surfaces of said blades. The shaft 14 is rotated in the direction of the arrow in Figure 2, and at such speed that it will elevate all of the soil forming the furrow slice and violently throw it laterally and upwardly from the line of advance of the implement.

In Figure 3 I have illustrated the several paths of travel of the soil being thrown from the soil throwing member at different speeds of rotation. When the gear shift device is at low gear, the soil will be thrown substantially in the manner indicated by the line 24 in Figure 1. When the gear shift is set at intermediate gear, the soil will be thrown as indicated by the dotted line 25. When the gear shift is set in high gear the soil will be thrown in about the manner indicated by the dotted line 26. Obviously, this gear shifting may be done when the machine is in operation, so that the operator at all times has full control of the distance to which the soil is being thrown, and he can thereby place the soil at the desired location for effective terracing work.

In some instances it is desirable to limit the distance to which the soil is thrown laterally, and to deposit it in a ridge, and for this purpose I have provided a substantially horizontally arranged shaft 27, mounted in bearings 28 carried by the machine frame, and on the outer end of this shaft I have fixed a disc 29. The position of the shaft may be adjusted longitudinally by sliding it through the bearings, as indicated by dotted lines in Figure 2. When this soil stopping device is employed the stream of soil from the soil throwing member will strike the inner face of the disc 29 and then drop by gravity and form a ridge.

Any suitable means may be provided for holding the shaft 27 at the desired distance from the soil throwing means.

In actual practice I have demonstrated that with my improved soil throwing machine, operated by an ordinary tractor, the machine can be efficiently operated under varying soil conditions and under almost any conditions in which an ordinary plow can form a furrow slice. In practice I have been able to operate the machine at about ten miles an hour when throwing soil in an amount equal to that delivered by the plow; and at high speed the soil may be delivered from the machine at a point about fifteen feet laterally from the line of advance of the machine, and more or less distance if a different gear shift ratio is used.

Due to the high speed of the helicoid blades the soil will not adhere to them, and they will not be affected in their operation by the accumulation of trash.

I claim as my invention:

1. A soil moving machine comprising a soil cutting and elevating member, and a soil throwing member formed with a helicoid blade, and means for rapidly rotating the blade in the direction for striking the soil from the cutting and elevating member and throwing it upwardly and laterally relative to the line of advance of the implement.

2. A soil moving machine comprising a soil cutting and elevating member, and a soil throwing member having two oppositely disposed helicoid blades arranged around an upright center, and means for rapidly rotating them in a path where they will engage substantially the entire quantity of soil in the cutting and elevating member and throw it upwardly and laterally relative to the line of advance.

3. A soil moving machine comprising a soil cutting and elevating member, and a soil throwing member having two oppositely disposed helicoid blades arranged around an upright center, means for rapidly rotating them in a path where they will engage substantially the entire quantity of soil from the cutting and elevating member and throw it upwardly and laterally relative to the line of advance, and a disc fixed in position at the base of the helicoid members.

4. A soil moving machine comprising a soil cutting and elevating member, and a soil throwing member formed with a helicoid blade, means for rapidly rotating the blade in the direction for striking the soil from the cutting and elevating member and throwing it upwardly and laterally relative to the line of advance of the implement, and a manually controlled gear shift device applied to said rotating means for selectively varying the distance to which the soil is thrown.

5. The combination with an implement having means for cutting and elevating soil and throwing it laterally and upwardly relative to the line of advance of the implement, of a soil stopping device carried by the implement and positioned to be engaged by the soil being thrown by the implement to thereby definitely limit the distance to which the soil is thrown, said soil stopping device being adjustable laterally relative to the implement.

6. The combination with an implement having means for cutting and elevating soil and throwing it laterally and upwardly relative to the line of advance of the implement, of a substantially horizontally arranged shaft supported by the implement, a rotatable disc carried by the shaft and positioned to be engaged by the soil thrown from the implement and to roll over the surface of the soil, and means for adjusting the disc laterally relative to the implement.

7. A soil moving machine comprising a soil cutting and elevating member, a rotatable soil throwing member positioned to receive soil from said cutting and elevating member, means for rapidly rotating said soil throwing member and a blade forming part of said soil throwing member and having its top surface shaped to receive and support against downward movement the soil from the cutting and elevating member, and said blade also having its top surface inclined relative to the horizontal to thereby throw soil resting thereon in an upward and lateral direction relative to the line of advance of the machine.

8. In a soil moving machine, the combination of a rotatable soil throwing device arranged in a substantially upright position and having a blade with its top surface inclined upwardly relative to its path of rotation, means for delivering soil to the top surface of said blade, and means for rotating the soil throwing means.

9. In a soil moving machine, the combination of a rotatable soil throwing device arranged in a substantially upright position and having a blade with its top surface inclined upwardly relative to its path of rotation, means for delivering soil to the top surface of said blade, means for rotating the soil throwing means, and a manually controlled gear shift device applied to said rotating means for selectively varying the distance to which the soil is thrown.

EDGAR V. COLLINS.